4 Sheets—Sheet 1.

C. W. SIEMENS.

VALVES FOR REGENERATOR-FURNACES.

No. 7,864. Reissued Aug. 28, 1877.

WITNESSES

W. B. Whitman

Saml R. Turner

INVENTOR

Charles William Siemens

Charles Sidney Whitman ATTORNEY

4 Sheets—Sheet 2.

C. W. SIEMENS.

VALVES FOR REGENERATOR-FURNACES.

No. 7,864. Reissued Aug. 28, 1877.

WITNESSES

W. B. Whitman

Saml R. Turner

INVENTOR

Charles William Siemens by

Charles Sidney Whitman ATTORNEY

4 Sheets—Sheet 3.

C. W. SIEMENS.

VALVES FOR REGENERATOR-FURNACES.

No. 7,864. Reissued Aug. 28, 1877.

WITNESSES

W. B. Whitman

Saml R Turner

INVENTOR

Charles William Siemens by

Charles Sidney Whitman ATTORNEY

4 Sheets—Sheet 4.

C. W. SIEMENS.

VALVES FOR REGENERATOR-FURNACES.

No. 7,864. Reissued Aug. 28, 1877.

WITNESSES

W. B. Whitman

Saml. R. Turner by

INVENTOR

Charles William Siemens

Charles Sidney Whitman ATTORNEY

UNITED STATES PATENT OFFICE.

C. WILLIAM SIEMENS, OF WESTMINSTER, ENGLAND.

IMPROVEMENT IN VALVES FOR REGENERATOR-FURNACES.

Specification forming part of Letters Patent No. 89,441, dated April 27, 1869; Reissue No. 7,864, dated August 28, 1877; application filed December 5, 1876.

DIVISION C.

*To all whom it may concern:*

Be it known that I, CHARLES WILLIAM SIEMENS, of Westminster, county of Middlesex, England, have invented certain improvements in the arrangement and construction of valves for distributing and regulating the currents of air and gas in regenerative gas furnaces.

The following description, taken in connection with the accompanying drawings hereinafter referred to, forms a full and exact specification, wherein are set forth the nature and principles of the invention, by which the same may be distinguished from others for which Letters Patent have heretofore been granted, together with such part thereof as I claim as new and desire to secure by reissued Letters Patent of the United States.

My invention relates to that class of furnaces known as regenerative gas-furnaces, for which Letters Patent of the United States were granted on the 1st day of March, 1864; and the nature thereof consists in an improved arrangement of the valves for distributing and regulating the currents of air and gas.

Figure 1:
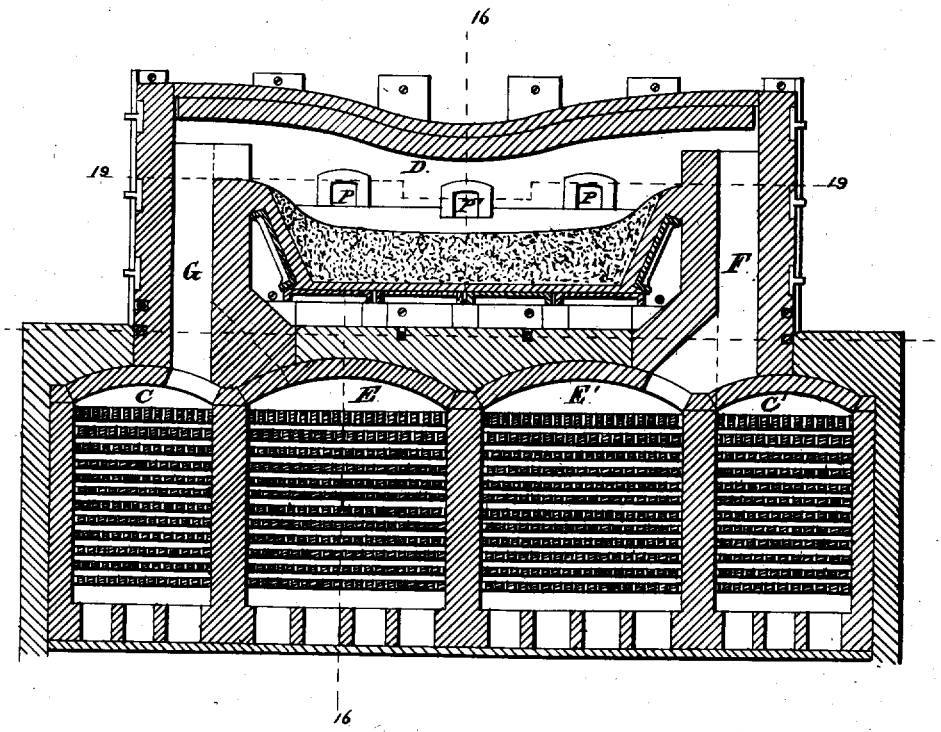
Figure 2:
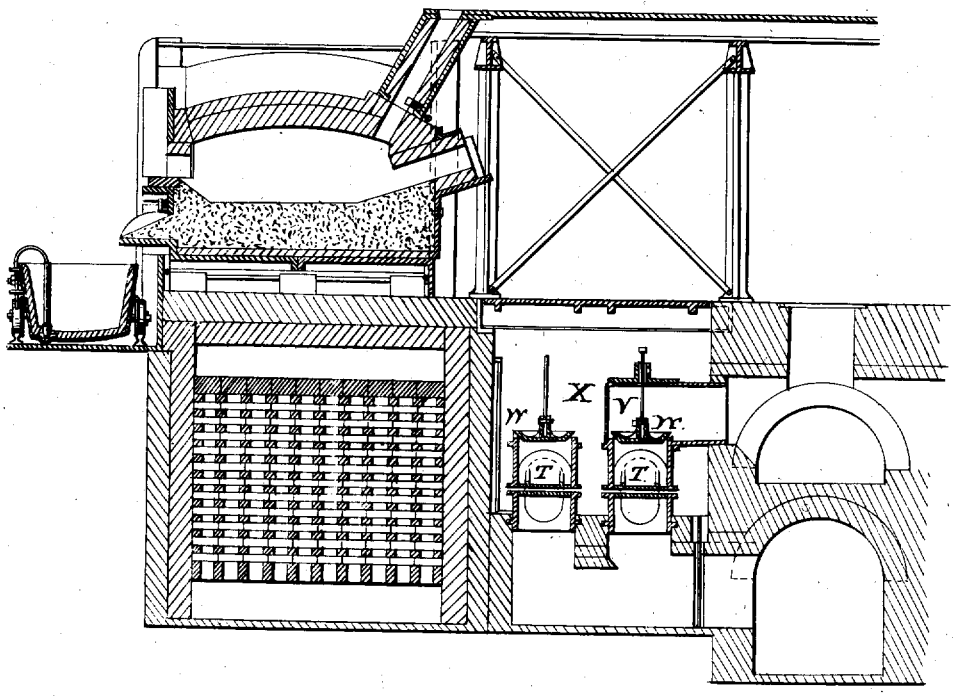
Figure 3:
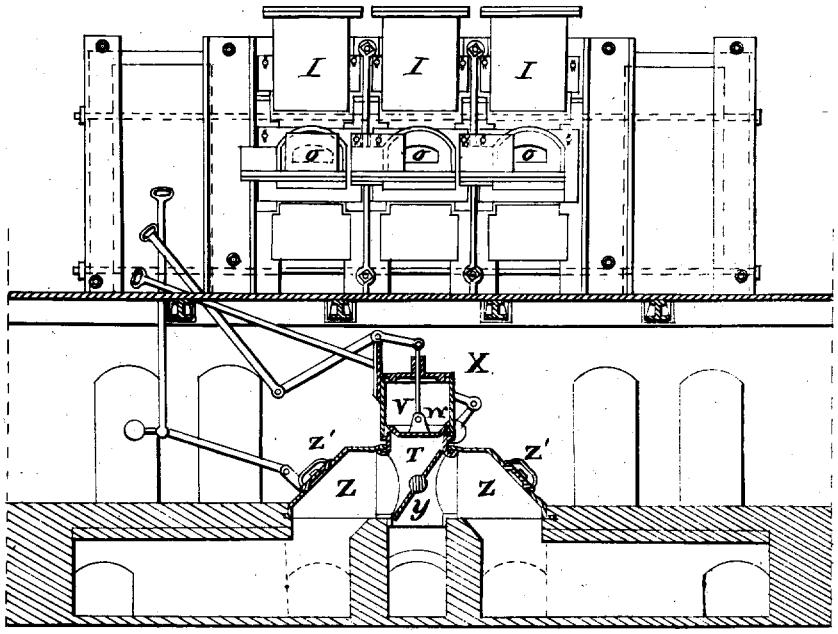
Figure 4:
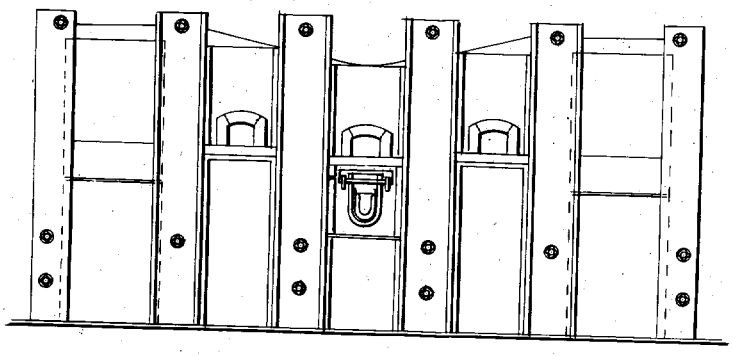
Figure 5:
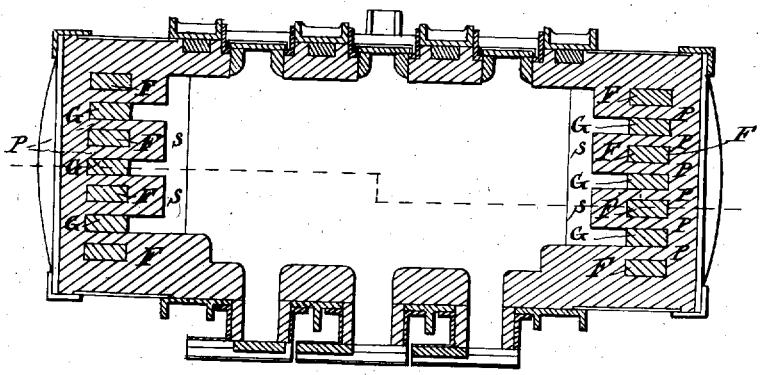

In the accompanying plate of drawings, Figure 1 is a longitudinal section of the furnace. Fig. 2 is a transverse section; Fig. 3, rear elevation of the furnace and a sectio i through the gas-passages. Fig. 4 is a front elevation. Fig. 5 is a sectional plan.

The regenerative gas-furnace, as shown in the drawings, is built of fire-brick, or other suitable refractory material, and consists of the four regenerators with their flues and valves, and the heating-chamber, where the metallurgical operations are carried on.

The four regenerators are arranged in pairs and vary in size, the smaller being used for the passage of gas, and the larger for that of air. The walls of the regenerators are built of fire-brick, or other suitable refractory material closely laid and made gas-tight, so that no leakage may take place from one chamber to another. These chambers are filled with refractory material, by preference, fire-brick stacked loosely together, and each regenerative chamber has its own separate flue at the base, communicating with the valves by which the gas and air enter or products of combustion pass out, while from the top and side of each regenerative chamber a series of flues lead upward and communicate with the heating-chamber.

The entering or issuing gaseous currents pass through valves X, one for gas and the other for air. The gas-valve is in communication with the gas-box V. Each valve consists of three parts, viz., a central piece, Y, and two side boxes, Z Z, which are usually made of cast-iron, and by preference, in three distinct pieces, which may be afterward suitably fastened together. In the central part Y is the reversing-flap T, which may be centered about a spindle and moved by levers, as shown. This flap is made to fit as exactly as possible, so that no leakage from one side of it to the other may take place. By its means the direction of the currents of gas or air, or of the escaping products of combustion, are completely under control. Upon each side of this central part are the side boxes Z Z, which are set upon the brick-work of the flues, of which they virtually form a part.

In passing through the e side boxes, which I prefer to expose to cooling influences, the gaseous currents themselves become cooled, and thus the reversing-flap is preserved from overheating and consequent warping. Each side box is fitted with a cover, Z′, carefully luted on, which is used for cleaning purposes. Above the reversing-flap is the throttle-valve W, through which air or gas is admitted to their respective flues. I prefer to make this circular in form, in the shape of an inverted mushroom, with the edges which fit the seat turned to the segment of a sphere, so that, when necessary, it may be shut down tight upon its seat.

The gas throttle-valve may be placed inside a gas-box of cast or wrought iron, into which the gas from the main flue may be led by a conduit of similar material, as shown. In the gas-box, and above the throttle-valve, may be fitted or luted on a movable cover, V, through which the interior may be reached for cleaning purposes.

On first lighting the furnace, the gas passes through the said valves and flues into the bottom of the regenerator-chamber C, while the air enters through corresponding valves and flues into the regenerator-chamber E. The currents of gas and air, both comparatively cold, rise separately through the regenerators C and E, and pass up through the flues, or series of flues, G G G and F F F F, respectively, into the furnace above, where they meet and are lighted, burning and producing a moderate heat. The products of combustion pass away through a similar set of flues at the other end of the furnace, into the regenerator-chambers C′ E′, and thence, through properly-constructed flues and valves, to the chimney-flue. The waste heat is thus deposited in the upper courses of open fire-brick work, filling the chambers C′ E′, and heating them up, while the lower portion and chimney-flue are comparatively cool. Then, after a suitable interval, the reversing-flaps T, through which the air and gas are admitted to or withdrawn from the furnace, are reversed, and the air and gas enter through those regenerator-chambers E′ C′, which have just been heated by the waste products of combustion, and, in passing up through the checker-work, they become heated, and then, on meeting and entering into combustion in the furnace D, they produce a very high temperature, the waste heat from such higher temperature of combustion heating up the previously cold regenerators C E to a corresponding higher heat. Thus an accumulation of heat and an accession of temperature are obtained step by step, so to speak, until the furnace is as hot as is required. The heat is, at the same time so thoroughly abstracted from the products of combustion by the regenerators that the chimney-flue remains comparatively cool.

The command of the temperature of the furnace and of the quality of the flame is rendered complete by means of gas and air regulating valves, and by the chimney-damper, as above described.

Having thus described my invention, I claim and desire to secure by Letters Patent of the United States—

1. In a regenerative gas-furnace, the reversing-valve, provided with metallic side boxes, substantially as shown and described.

2. In combination with the reversing-valve and side boxes, the mushroom throttle-valve, substantially as herein described.

In testimony that I claim the foregoing I have hereunto set my hand this 11th day of September, 1876.

C. WILLIAM SIEMENS.

Witnesses:

W. W. ANTHONY,

THOMAS ROBINSON,

*Clerks to Ridgway Bros., 2 Waterloo Place, Pall Mall, London.*